Dec. 24, 1957  B. MILLER  2,817,795
CURB BOX CHARGER
Filed April 4, 1952

Basil Miller
INVENTOR.

BY *Clarence A. O'Brien*
*and Harvey B. Jacobson*
Attorneys

United States Patent Office 2,817,795
Patented Dec. 24, 1957

2,817,795
CURB BOX CHARGER
Basil Miller, Elkhorn, Wis.

Application April 4, 1952, Serial No. 280,562

1 Claim. (Cl. 317—159)

This invention relates to a curb box charger and particularly to a marking device to apply a magnetic charge to hidden metal objects so they may be readily discovered by means of a magnetic needle.

In the construction and utilization of utilities such as sewer, water, electricity, gas, etc., it is frequently desirable to have outlets for the system which can be readily located so that the system may be turned off or other repairs made therein. It frequently happens that these boxes or outlets become covered with dirt or paving material or in the winter time with snow and ice so that it is impossible to find the devices without an excessive amount of experimental digging. It is known that elongated metallic objects such as pipes or curb boxes, have a tendency to be magnetized by the earth's magnetism. However, it is also known that the reluctance of the material of which these boxes are composed substantially defeats any magnetization thereof by means of the earth currents. However, when the earth currents are aided by means of a magnetizing device such devices are easily magnetized and because of the said reluctance retains the magnetism over a considerable length of time, even over a period of years.

The present invention provides a charger adapted to assist in producing magnetization of buried metal objects, particularly elongated metal objects, so that they may have a material magnetic influence and may be readily determined by means of a magnetic dip needle.

The structure according to the present invention provides a magnet of high permeability such as the magnets made of Alnico or other high permeability alloys. To allow proper utilization of such a magnetic device, a shield in the form of a tubular guide of magnetic material is provided and means is provided for locating the magnet within the shield when it is not in use. In order to use the device for increasing the magnetization of a buried metal object a non-metallic end, such as a brass tube, is applied to the shield and means are provided, such as a handle, for projecting the magnet into the tube. If desired, a magnetic piece may be applied at the end of the tube to serve the double purpose of a magnetic tip and an anchoring means for retaining the magnet in the non-magnetizable guide.

It is accordingly an object of this invention to provide a curb box marker.

It is a further object of this invention to provide a device for magnetizing buried metallic objects.

It is a further object of this invention to provide a magnetizer having a shield for preventing undesired magnetization of surrounding objects.

It is a further object of this invention to provide a marker having a movable magnet therein which can be extended to produce magnetization or moved within a shield to prevent other magnetic disturbances.

Other objects and many of the intended advantages of this invention will be apparent from the following detailed description taken in conjunction with the accompanying drawing, in which.

Figure 1:
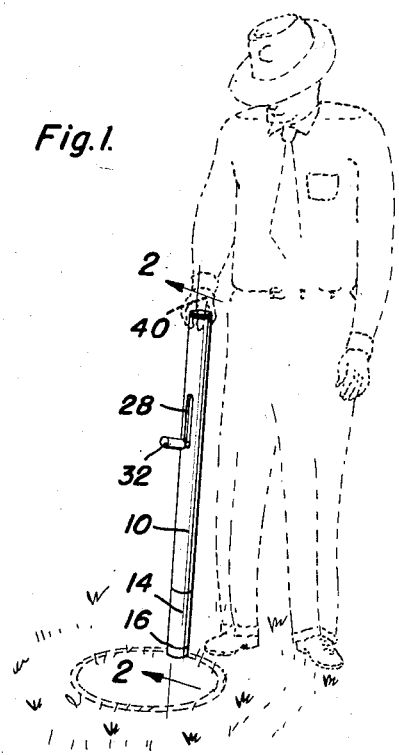
Figure 1 is elevational view of the magnetizing device in operative position.
Figure 2:
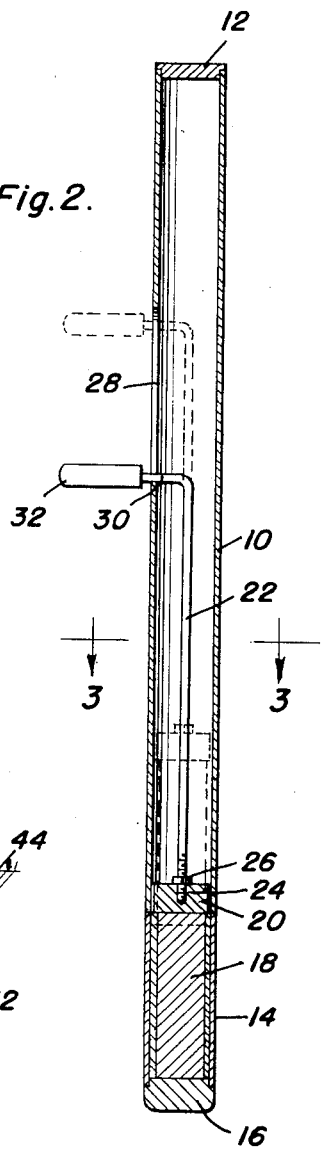
Figure 2 is a vertical section taken on the plane indicated by the line 2—2 of Figure 1 and showing the construction of the marker device.
Figure 4:
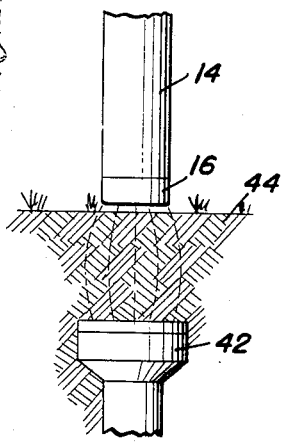
Figure 3:
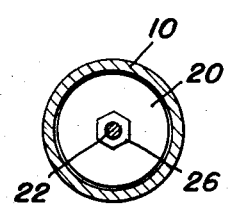
Figure 3 is a cross-section through the device taken on the plane indicated by the line 3—3 of Figure 2 and further showing the construction of the magnet slidable within the metal core; and, Figure 4 is a fragmentary elevation partially in section showing the magnetic flux extending from the magnetizer tip to a metallic object such as a box buried below the surface.

In the exemplary embodiment of the invention a shield 10 is provided in form of an elongated metal tube, preferably constructed of thin metallic material such as steel. Any suitable enclosure such as the stop 12 may be applied to the top end of the shield 10 and an extension 14 of non-magnetic material, such as brass or plastic, is secured permanently to one end of the guide 10. A non-magnetic extension 14 is preferably tubular and are exactly the same dimensions as the guide 10, at least on the inside thereof. Extension 14 is terminated by a tip 16 made of suitable magnetic material, such as steel.

The magnet 18, preferably of rod-like shape and constructed of material of high permeability, such as Alnico, is mounted within the shield 10, has a fastening cap 20 attached thereto. A control element such as a rod 22 is connected to the cap 20 by means of any suitable means such as the threaded connection 24 held in permanent fixed relation by means of the lock nut 26. The guide 10 is provided with a lateral slot 28 and the rod 22 is provided with an extension 30 extending through the slot 28 and having an operative handle 32 connected thereto.

In the operation of the curb box charger the device is taken to a location where it is desired to mark an object and is held in the hand 40 of an operator and when the object can be found the tip 16 will be placed in contact with the object, preferably on the north side thereof, and the magnet extended into the non-metallic extension 14 by depressing the handle 32. A high permeability magnet when extended into the non-magnetic portion 14 will cause a stream of flux to extend outwardly from the tip 16 and will cause magnetization of any metal object adjacent thereto.

When the exact location of the metallic object, such as the curb box 42, is covered by impervious material, such as the asphalt on 44, charge is produced by moving the charger across the surface in the vicinity where the object is supposed to be. Then conceal the magnet 18 within the guide 10 and remove it from the immediate vicinity so that it will not effect the dip magnet, and a dip magnet will then be used to find the exact location of the box 42. Preferably a portion of the box is then uncovered and the tip 16 applied directly thereto and the magnet extended into the extension 14 so that a heavy charge will be imparted to the box 42. When it is desired to locate a horizontal pipe draw the charger at right angles to the direction of the pipe with the magnet shoved into the extension 14. Then follow the path over which the charger has passed with a dip needle which will then show the exact location of the pipe which may be again opened and charged so that it may be readily located in the future.

The best results are of course obtained when the tip can be brought directly into contact with the metallic object, it has been found, that very good results have been obtained when the metallic object is buried by as much as 18 inches of overlying material. This effective magnetization is obtained because of the high permeability magnet and the utilization of a non-magnetic guide or extension so that the magnet may be completely inclosed by non-magnetic material with a magnetic shield adjacent thereto so that the flux from the magnet extends in substantially radiating direction from the tip 16 of the magnetizing device.

It will thus be seen that the present invention provides an effective manner of locating curb boxes and other buried metallic objects so that they may be readily located regardless of overlying paving material, mud, snow, ice, etc.

For purpose of exemplification a particular embodiment of the invention has been shown and described according to the best present understanding thereof, however, it will be apparent to those skilled in the art that many changes and modifications can be made therein without departing from the true spirit of the invention.

Having thus described the invention, what is claimed as new is:

A curb box charger for locating underground fittings formed of a ferrous metal, said curb box charger comprising an elongated tubular steel body, a brass tubular section having an upper end secured to said steel body and forming a continuation of said steel body, a steel tip secured to said brass section and closing the lower end of said brass section, said steel tip including a reduced upper portion telescoped within the lower end of said brass section, an elongated Alnico magnet mounted in said body for movement into and out of said brass section and into and out of engagement with said steel tip, said magnet being of a length whereby when engaged with said steel tip, the upper end thereof lies in the same plane as the upper end of said brass section, a control rod secured to the upper end of said magnet for selectively positioning said magnet either in said tubular steel body or in said brass tubular section whereby said magnet is selectively rendered operative or inoperative, an elongated slot in said steel body, a transverse handle secured to said rod and extending through said slot to facilitate the movement of said rod and said magnet.

References Cited in the file of this patent

UNITED STATES PATENTS

| | | |
|---|---|---|
| 2,285,440 | Kaiser | June 9, 1942 |
| 2,417,762 | Koller | Mar. 18, 1947 |
| 2,471,764 | Miller et al. | May 31, 1949 |
| 2,693,979 | Russell | Nov. 9, 1954 |